United States Patent
Chen et al.

(10) Patent No.: US 9,575,664 B2
(45) Date of Patent: Feb. 21, 2017

(54) WORKLOAD-AWARE I/O SCHEDULER IN SOFTWARE-DEFINED HYBRID STORAGE SYSTEM

(71) Applicant: ProphetStor Data Services, Inc., Taichung (TW)

(72) Inventors: Wen Shyen Chen, Taichung (TW); Ming Jen Huang, Taichung (TW)

(73) Assignee: Prophetstor Data Services, Inc., Taichung (TW)

( * ) Notice: Subject to any disclaimer, the term of this patent is extended or adjusted under 35 U.S.C. 154(b) by 71 days.

(21) Appl. No.: 14/681,329

(22) Filed: Apr. 8, 2015

(65) Prior Publication Data
US 2016/0299697 A1   Oct. 13, 2016

(51) Int. Cl.
 *G06F 3/06* (2006.01)
(52) U.S. Cl.
 CPC ........... *G06F 3/0611* (2013.01); *G06F 3/061* (2013.01); *G06F 3/0613* (2013.01); *G06F 3/0659* (2013.01); *G06F 3/0685* (2013.01)
(58) Field of Classification Search
 CPC ...... G06F 3/0613; G06F 3/0638; G06F 3/064; G06F 3/0653; G06F 3/0685; G06F 2003/0691; G06F 13/10; G06F 13/102
 See application file for complete search history.

(56) References Cited

U.S. PATENT DOCUMENTS

| | | | | |
|---|---|---|---|---|
| 7,739,470 B1* | 6/2010 | Norgren | ............... | G06F 11/3485 709/224 |
| 2004/0194095 A1* | 9/2004 | Lumb | ................... | G06F 9/4887 718/100 |
| 2007/0043854 A1* | 2/2007 | Shum | .................. | H04L 12/2602 709/224 |
| 2007/0198750 A1* | 8/2007 | Moilanen | .............. | G06F 9/5083 710/6 |
| 2012/0166723 A1* | 6/2012 | Araki | .................. | G06F 12/0871 711/113 |
| 2013/0117286 A1* | 5/2013 | Gallant | ..................... | G06F 7/24 707/752 |
| 2013/0326064 A1* | 12/2013 | Gulati | ................... | G06F 9/5061 709/226 |
| 2015/0242133 A1* | 8/2015 | Smith | .................. | G06F 3/0613 711/114 |
| 2015/0355861 A1* | 12/2015 | Jayaraman | ............ | G06F 3/0613 711/103 |
| 2016/0134493 A1* | 5/2016 | Susarla | ..................... | G06F 3/06 709/224 |

* cited by examiner

*Primary Examiner* — Hal Schnee
(74) *Attorney, Agent, or Firm* — Che-Yang Chen; Law Offices of Scott Warmuth

(57) ABSTRACT

A workload-aware I/O scheduler in a Software-Defined Hybrid Storage (SDHS) system is disclosed. The scheduler includes a queue managing module, a workload property database, a traffic monitoring module, and a traffic modeling module. The queue managing module further has a request receiving sub-module, a request controlling sub-module, and a request dispatching sub-module. With the operations of the queue managing module, requests for accesses of HDDs and SSDs can be separately queued. Thus, performance of the SDHS can be improved. Meanwhile, the scheduler can be used for requests from a number of workloads at the same time while meet performance requirement of each workload.

20 Claims, 3 Drawing Sheets

| Condition No. | Requirements | | Properties | | Output | |
| --- | --- | --- | --- | --- | --- | --- |
| | Throughput | Latency | R/W Ratio | Block Size | Queue Depth | Wait Time |
| 1 | High | Low | ≥ 1 | ≥ 8K | Medium | Short |
| 2 | High | Low | ≥ 1 | < 8K | Deep | Medium |
| 3 | High | Low | < 1 | ≥ 8K | Medium | Short |
| 4 | High | Low | < 1 | < 8K | Medium | Short |
| 5 | Low | Low | ≥ 1 | ≥ 8K | Shallow | Short |
| 6 | Low | Low | ≥ 1 | < 8K | Medium | Medium |
| 7 | Low | Low | < 1 | ≥ 8K | Shallow | Short |
| 8 | Low | Low | < 1 | < 8K | Shallow | Short |
| 9 | High | Medium | ≥ 1 | ≥ 8K | Medium | Medium |
| 10 | High | Medium | ≥ 1 | < 8K | Deep | Long |
| 11 | High | Medium | < 1 | ≥ 8K | Medium | Short |
| 12 | High | Medium | < 1 | < 8K | Medium | Medium |
| 13 | Low | Medium | ≥ 1 | ≥ 8K | Shallow | Short |
| 14 | Low | Medium | ≥ 1 | < 8K | Shallow | Medium |
| 15 | Low | Medium | < 1 | ≥ 8K | Shallow | Short |
| 16 | Low | Medium | < 1 | < 8K | Shallow | Medium |

Fig. 3

WORKLOAD-AWARE I/O SCHEDULER IN SOFTWARE-DEFINED HYBRID STORAGE SYSTEM

FIELD OF THE INVENTION

The present invention relates to an I/O scheduler. More particularly, the present invention relates to a workload-aware I/O scheduler in a software-defined hybrid storage system.

BACKGROUND OF THE INVENTION

I/O scheduler is used by computer operating systems to decide in which order block I/O operations will be submitted to storage volumes. Depending on different goals to achieve, one I/O scheduler may minimize time wasted by hard disk seeks, prioritize a certain processes of I/O requests, give a share of the disk bandwidth to each running process, and/or guarantee certain I/O requests being issued before a particular deadline. For example, Deadline scheduler in Linux kernel is used to guarantee a start service time for a request. It does so by imposing a deadline on all I/O operations to prevent starvation of requests. Hence, the deadline scheduler favors reads over writes via use of separate I/O queues. It runs well for database workloads. Another example is Complete Fair Queuing (CFQ) scheduler. The CFQ scheduler places synchronous requests submitted by processes into a number of per-process queues and then allocates time slices for each of the queues to access the disk. Thus, the CFQ scheduler is suitable for sequential read video or audio streaming and workloads from general hosts.

The schedulers mentioned were proposed to improve performance of a HDD or of a storage system composed of HDDs. There are certain characteristics of HDDs described below. First, multiple I/O requests (both read and write) may be merged to form a single request which is processed in one movement of a read-and-write head (r/w head). Therefore, the number of movements of the r/w head can be reduced and that increases HDD's throughput. Second, I/O requests are sorted to improve seek time by reducing forward-and-backward movement of HDD's r/w head. Based on the characteristics, I/O requests waiting in queue for future processing may be merged and sorted. Workloads with different characteristics can be processed with better performance when using different schedulers.

A main stream of storage systems, especially for those of a cloud system, is to use a combination of Solid State Drives (SSDs) and HDDs. Besides HDDs, there are SSDs in the storage systems, thus most current schedulers may not meet their goals when they are applied thereto. Different from HDDs, SSDs have distinct characteristics illustrated below. First, the SSDs don't need to merge and sort SSD I/O requests, which imply no merging and sorting time needed. The I/O requests should be sent to SSD as soon as possible. Second, SSD I/O requests might be parallelized because many modern SSDs have multi-channels, which can accommodate multiple I/O requests at the same time. If the storage system applying the scheduler is a software-defined hybrid storage system, the situation is more complex for the scheduler to handle. Hence, current schedulers should be modified to take the existence of SSDs into consideration.

In addition, traffic characteristics of a workload are another important issue for further investigation. Any workload may have some properties that are different from others. The properties may be an I/O pattern (sequential or random), a read/write ratio, a SSD cache hit ratio, etc. For example, a workload of an On-Line Transaction Processing (OLTP) database has a random I/O pattern, a read/write ratio greater than 1, and smaller storage block size; while another workload of a MongoDB has a sequential I/O pattern, a read/write ratio smaller than 1, and larger storage block size. If the two workloads run over the same hybrid storage system, the current scheduler nowadays cannot meet the performance requirement in the Service Level Agreements (SLA) for both. At least, a noisy neighbor problem exists to affect the workloads.

There are some prior arts regarding solutions for the above requirement. One example is disclosed in the U.S. Pat. No. 8,756,369. In '369, a storage system includes a command sorter to determine a target storage device for at least one of a SSD command and a HDD command, place the command in a SSD ready queue if the SSD command is targeted to a SSD storage device of the storage system, and place the HDD command to a HDD ready queue if the HDD command is targeted to an HDD storage device of the storage system. The storage system also includes a SSD ready queue to queue the SSD command targeted to the SSD storage device, and a HDD ready queue to queue the HDD command targeted to the HDD storage device. Meanwhile, a command scheduler takes the HDD and SSD commands from the ready queues and places the commands into a command processor. The command scheduler places a particular (HDD or SSD) command from its respective ready queue into the command processor based on an availability level of a process queue corresponding to a target device of the particular command. Then, the command processor gives the storage commands to the process queues.

The storage system provided by the '369 differentiates HDD commands (I/O requests) from SSD commands. It helps for hardware operation for one workload. However, if multi-workloads are applied, the storage system may not work as it is set to be. On the other hand, for a variety of workloads run over the storage system, there is no suitable way to coordinate the requests from every workload so that each workload can meet the requirement in the SLA or a Quality of Service (QoS) requirement. Therefore, a workload-aware I/O scheduler in a software-defined hybrid storage system to settle the problems mentioned above is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirement mentioned above, a workload-aware I/O scheduler in a Software-Defined Hybrid Storage (SDHS) system which has at least one Hard Disk Drive (HDD) and a Solid State Drive (SSD) includes: a queue managing module, for managing queues, read requests, and write requests, including: a request receiving sub-module, for temporarily holding the read requests and the write requests; a request controlling sub-module, for creating workload queues, dynamically configuring the workload queues according to a scheduler configuration function, and arranging the read requests and write requests to the workload queues; and a request dispatching sub-module, for creating device queues and dispatching each read request or write request from the workload queues to a specified device queue; a workload property database, for storing properties of the workloads for access; and a traffic monitoring module, for monitoring and keeping recording a value of a performance parameter of the SDHS system, and providing the value of the performance parameter to the request controlling sub-module;

The scheduler configuration function calculates a queue depth and a wait time for each workload queue based on the properties provided from the workload property database and the received values of the performance parameter, to adjust values of the performance parameter of the SDHS system in the future falling between a performance guarantee and a performance throttling set for the performance parameter.

The workload-aware I/O scheduler further includes a traffic modeling module, for modeling storage traffic of the requests from the workload(s) and providing predictive storage traffic of properties in a specified time in the future.

Preferably, the properties are a read/write ratio, a merge ratio, a SSD hit ratio, and a storage block size. The performance parameters are IOPS, throughput, latency, or a combination thereof. The performance guarantee and the performance throttling are defined by a Service Level Agreement (SLA) or a Quality of Service (QoS) requirement of the workload. Each workload queue is classified as deep-leveled, medium-leveled, or shallow-leveled, and each wait time is classified as a long duration, a medium duration, or a short duration, wherein queue depths of a deep-leveled workload queue accommodate more read requests or write requests than queue depths of a medium-leveled workload queue; queue depths of a medium-leveled workload queue accommodate more read requests or write requests than queue depths of a shallow-leveled workload queue; and storage block size has a medium size; the long duration is longer than the medium duration; and the medium duration is longer than the short duration.

In one example, if the received values of IOPS or throughput are close to respective performance throttlings, the received values of latency are close to or below the performance guarantee, the read/write ratio is greater than or equal to 1, and the storage block size is greater than or equal to the medium size, the queue depth of the workload queue is set to be medium-leveled and the wait time for each workload queue is set to be short duration.

In one another example, if the received values of IOPS or throughput are close to respective performance throttlings, the received values of latency are close to or below the performance guarantee, the read/write ratio is greater than or equal to 1, and the storage block size is smaller than the medium size, the queue depth of the workload queue is set to be deep-leveled and the wait time for each workload queue is set to be medium duration.

In one another example, if the received values of IOPS or throughput are close to respective performance throttlings, the received values of latency are close to or below the performance guarantee, and the read/write ratio is smaller than 1, the queue depth of the workload queue is set to be medium-leveled and the wait time for each workload queue is set to be short duration.

In one another example, if the received values of IOPS or throughput are close to or below respective performance guarantees, the received values of latency are close to or below the performance guarantee, the read/write ratio is greater than or equal to 1, and the storage block size is greater than or equal to the medium size, the queue depth of the workload queue is set to be shallow-leveled and the wait time for each workload queue is set to be short duration.

In one another example, if the received values of IOPS or throughput are close to or below respective performance guarantees, the received values of latency are close to or below the performance guarantee, the read/write ratio is greater than or equal to 1, and the storage block size is smaller than the medium size, the queue depth of the workload queue is set to be medium-leveled and the wait time for each workload queue is set to be medium duration.

In one another example, if the received values of IOPS or throughput are close to or below respective performance guarantees, the received values of latency are close to or below the performance guarantee, and the read/write ratio is smaller than 1, the queue depth of the workload queue is set to be shallow-leveled and the wait time for each workload queue is set to be short duration.

In one another example, if the received values of IOPS or throughput are close to respective performance throttlings, the received values of latency are not close to or below the performance guarantee, the read/write ratio is greater than or equal to 1, and the storage block size is greater than or equal to the medium size, the queue depth of the workload queue is set to be medium-leveled and the wait time for each workload queue is set to be medium duration.

In one another example, if the received values of IOPS or throughput are close to respective performance throttlings, the received values of latency are not close to or below the performance guarantee, read/write ratio is greater than or equal to 1, and the storage block size is smaller than the medium size, the queue depth of the workload queue is set to be deep-leveled and the wait time for each workload queue is set to be long duration.

In one another example, if the received values of IOPS or throughput are close to respective performance throttlings, the received values of latency are not close to or below the performance guarantee, the read/write ratio is smaller than 1, and the storage block size is greater than or equal to the medium size, the queue depth of the workload queue is set to be medium-leveled and the wait time for each workload queue is set to be short duration.

In one another example, if the received values of IOPS or throughput are close to respective performance throttlings, the received values of latency are not close to or below the performance guarantee, the read/write ratio is smaller than 1, and the storage block size is smaller than the medium size, the queue depth of the workload queue is set to be medium-leveled and the wait time for each workload queue is set to be medium duration.

In one another example, if the received values of IOPS or throughput are close to or below respective performance guarantees, the received values of latency are not close to or below the performance guarantee, and the storage block size is greater than or equal to the medium size, the queue depth of the workload queue is set to be shallow-leveled and the wait time for each workload queue is set to be short duration.

In one another example, if the received values of IOPS or throughput are close to or below respective performance guarantees, the received values of latency are not close to or below the performance guarantee, and the storage block size is smaller than the medium size, the queue depth of the workload queue is set to be shallow-leveled and the wait time for each workload queue is set to be medium duration.

In one another example, if the SSD hit ratio increases, the queue depth of the workload queue stays the same or becomes shallower and the wait time for each workload queue keeps the same or becomes shorter, otherwise the queue depth of the workload queue stays the same or becomes deeper and the wait time for each workload queue keeps the same or becomes longer.

In one another example, if the merge ratio increases, the queue depth of the workload queue stays the same or becomes shallower and the wait time for each workload queue keeps the same or becomes shorter, otherwise the queue depth of the workload queue stays the same or becomes deeper and the wait time for each workload queue keeps the same or becomes longer.

Preferably, the medium size is 8 KB.

BRIEF DESCRIPTION OF THE DRAWINGS

FIG. 3 tabulates complete conditions of workloads of the I/O scheduler

DETAILED DESCRIPTION OF THE PREFERRED EMBODIMENT

The present invention will now be described more specifically with reference to the following embodiment.

Figure 1:
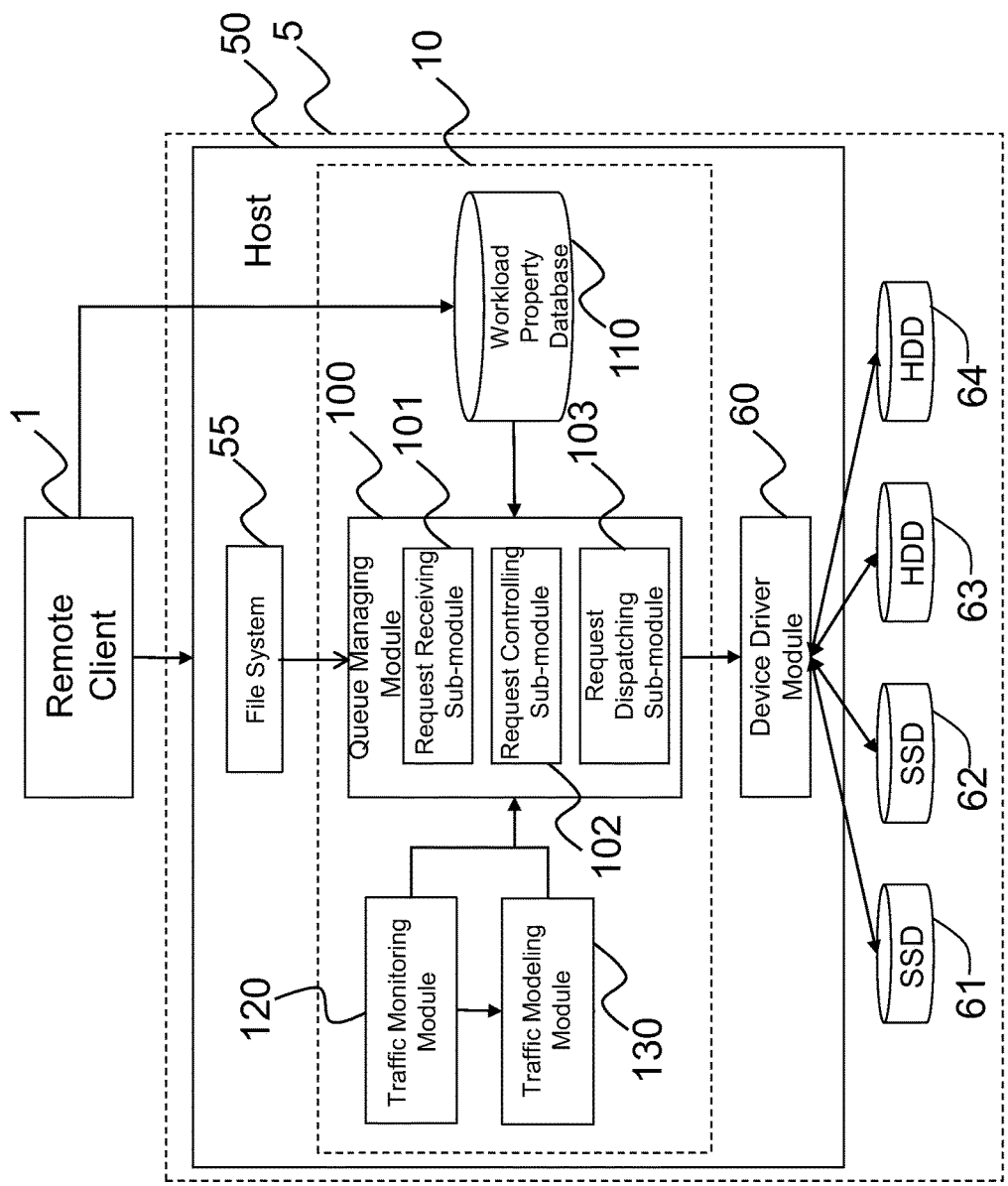
FIG. 1 depicts an embodiment of a cloud storage system having a workload-aware I/O scheduler according to the present invention.

Please refer to FIG. 1. An embodiment of the present invention is illustrated. A cloud storage system 5 shown in FIG. 1 is a Software-Defined Hybrid Storage (SDHS) system. SDHS enables rapid policy-based creation, deletion, and management of data storage within the cloud infrastructure that the cloud storage system 5 uses. SDHS usually are in a form of storage virtualization to separate the software from the storage hardware it manages. Other than general software-defined storages, SDHS systems include disks of more than one type. It is often composed of two kinds of disks, for example HDDs and SSDs, for requirements from workloads with different characteristics. Thus, the cloud storage system 5 can be applied to many workloads as well. Those workloads may be an On-Line Transaction Processing (OLTP) database, a video streaming service, Virtual Desktop Infrastructure (VDI) environments, an e-mail server, a backup server, or a file server. All services or infrastructures utilizing SDHS as a storage element are the workload according to the spirit of the present invention.

The cloud storage system 5 receives read or write requests from many clients in a network. In order to simplify the description for the present invention, only a remote client 1 is used on behalf of all clients. Basically, I/O operations of the cloud storage system 5 for all clients are the same but different in priority of processing and replied duration for individual workload under distinct conditions. When the embodiment is read, it should be considered that there are many remote clients 1 sending read/write requests to the cloud storage system 5 and waiting for replies at the same time.

A workload-aware I/O scheduler 10 is installed in the cloud storage system 5. It is the key portion of the present invention. The scheduler 10 is workload-aware because it can differentiate the workload that one request for from others. The scheduler 10 has a queue managing module 100, a workload property database 110, a traffic monitoring module 120, and a traffic modeling module 130. Each of them will be described in details below. It should be noticed that the I/O scheduler 10 can be in the form of software running in a host 50 of the cloud storage system 5. It can also be a physical hardware working for the cloud storage system 5 inside the host 50. Or, the I/O scheduler 10 can be partially implemented by hardware while the rest portions are software-driven. It is not limited by the present invention.

Figure 2:
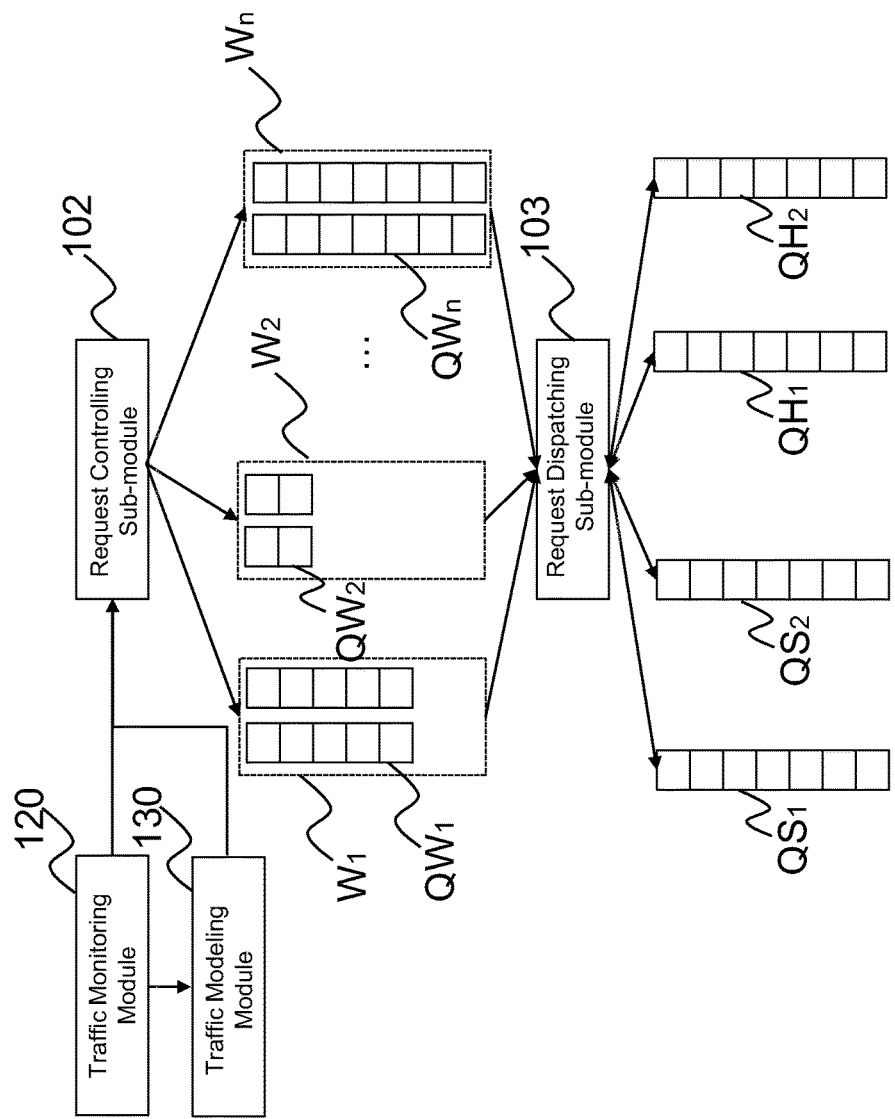
FIG. 2 illustrates operation of a request controlling sub-module and a request dispatching sub-module.

The main function of the queue managing module 100 is to manage queues, read requests, and write requests from a file system 55 of the host 50. The queue managing module 100 has three important sub-modules. They are a request receiving sub-module 101, a request controlling sub-module 102, and a request dispatching sub-module 103. The request receiving sub-module 101 can temporarily hold the read requests and the write requests from the file system 55. The requests will later be sorted in accordance with workloads and then arranged into a write queue and a read queue in a workload queue group. The write queue lines up write requests for one specified workload, and the read queue holds read requests sequentially for the same workload. It should be emphasized again that there may be many different workloads utilizing the cloud storage system 5 at the same time. There are also many workload queue group $W_1$ to $W_n$ as shown in FIG. 2.

The request controlling sub-module 102 is the one to create workload queues (write queues and read queues) for requests of each workload. After the workload queues are setup, the request controlling sub-module 102 can further dynamically configure the workload queues according to a scheduler configuration function. The scheduler configuration function works to decide how deep the workload queues are and how long each request waits for the opportunity of merging to be processed. It will be described in details later. Therefore, the request controlling sub-module 102 arranges the read requests and write requests to the related workload queues.

The request dispatching sub-module 103 is in charge of creating device queues. Each device queue contains the requests (read and/or write) for one specified device, i.e. a SSD 61, 62 or a HDD 63, 64. The requests may come from one workload queue group or some of the workload queue groups. The request dispatching sub-module 103 will dispatch each read request or write request from the workload queues to one specified device queue. One request will be processed if other requests queued before it have been processed. In some design of the host 50, the dispatching may go through a device driver module 60 to trigger the corresponding driver of the storage. The request dispatching sub-module 103 provides a very good function that other scheduler cannot achieve. It separates requests to HDDs from that to SSDs. Thus, requests to SSDs can be processed without waiting in queue along with other requests to HDDs. Performance of the cloud storage system 5 can be improved.

The workload property database 110 stores properties of the workloads for access. The properties are the factors which the scheduler configuration function uses to determine queue depths and wait time. According to the present invention, the properties are a read/write ratio, a SSD hit ratio, a merge ratio, and a storage block size. The read/write ratio is a proportion of read requests to write requests of one workload. For one workload, it often has a normal pattern of usage that read requests are more than write requests or the write requests exceed the read requests. For some special case, one workload, e.g. a backup server, may even have write requests but no read request.

The SSD hit ratio refers to how often the SSDs in the cloud storage system 5 will be accessed no matter which workload the requests are for. Quantities or spaces of SSDs used for each workload may vary depending on use condition of workload. Thus, SSD hit ratio for each workload may change from time to time. If the SSD hit ratio increases, the queue depth of the workload queue may stay the same or become shallower, and the wait time for each workload queue may keep the same or become shorter. Otherwise, the queue depth of the workload queue may stay the same or become deeper, and the wait time for each workload queue may keep the same or becomes longer. Keeping or changing the queue depth or wait time is based on the degree of increase/decrease. A threshold between keeping and changing, and changed quantity of degree can be set before the cloud storage system 5 is online to work. The mentioned way is a guideline for setting the rule. Quantitative description of "shallow", "short", "deep", and "long" will be given later. The use of comparatives is to increase or decrease toward that level.

The read/write ratio is an index to express the read/write pattern. The merge ratio counts for accesses of HDDs only. It is the proportion of requests which are merged with other requests (change of processing priority) to be processed during the same movement of an r/w head. For example, in the beginning of a fixed duration ($t_a$), there are 10 HDD read requests in the queue. At the end of the duration ($t_b$), the requests are merged and the number of requests in the queue becomes 7. We say that the merge ratio at $t_b$ is 0.3. It comes from below formula:

$$\frac{|r(t_b) - r(t_a)|}{r(t_a)}, \text{ where } t_b > t_a$$

(t) denotes the function of getting number of requests in a queue at time t. The higher the merge ratio is, the higher the throughput of HDD will be (30% higher shown in this example). However, if the requests wait long enough to get maximum throughput, the latency may also become longer. Longer latency makes user experience worse. For one workload, its merge ratio may also change from time to time. If the merge ratio increases, the queue depth of the workload queue may stay the same or become shallower, and the wait time for each workload queue may keep the same or become shorter. Otherwise the queue depth of the workload queue may stay the same or become deeper, and the wait time for each workload queue may keep the same or become longer. Similarly, quantitative description of "shallow", "short", "deep", and "long" will be given later. The use of comparatives is to increase or decrease toward that level.

Storage block size is space of a basic physical storage unit that the HDD or SSD has. It may vary from 4 KB or smaller to 16 MB or larger. Generally, the medium size is 8 KB in use. With the development of technology of storage, the medium size will increase. For illustrative purpose, in the description, 8 KB is set as the medium. It is not intent to limit the application of the present invention. For different storage block size and condition, strategy of the scheduler configuration function to determine queue depth and wait time is different. This will be explained later.

The traffic monitoring module 120 can monitor and keep recording a value of a performance parameter of the cloud storage system 5. It can also provide the value of the performance parameter to the request controlling sub-module 102. The performance parameter is IOPS, throughput, latency, or a combination thereof. The traffic modeling module 130 is used for modeling storage traffic of the requests from the workload(s) and providing predictive storage traffic of properties in a specified time in the future. The data used for modeling come from the traffic monitoring module 120. Any suitable methods, algorithms, or modules that provide such predictions can be applied. It is best to utilize a storage traffic modeling system provided by the same inventor in U.S. patent application Ser. No. 14/290, 533. Co-reference of the same techniques can be acquired from the application. The modeled storage traffic of the requests from the workload(s), as well as the predictive storage traffic of properties, can be a reference for the request controlling sub-module 102 to prepare configurations of workload queues and wait time in the future.

Below, the operation of the scheduler configuration function is described with examples for all conditions. The scheduler configuration function calculates the queue depth and the wait time for each workload queue based on the properties provided from the workload property database and the received values of the performance parameter(s). Therefore, the scheduler configuration function can adjust values of the performance parameter of the cloud storage system 5 in the future falling between a performance guarantee and a performance throttling set for the performance parameter(s). The said performance guarantee and the performance throttling are defined by a Service Level Agreement (SLA) or a Quality of Service (QoS) requirement of the workload(s). Each workload queue is classified as deep-leveled, medium-leveled, or shallow-leveled. Each wait time is classified as a long duration, a medium duration, or a short duration.

According to the spirit of the present invention, there is not absolute delimiter for each classified workload queue as well as the classified wait time in operation. A guideline is that queue depths of a deep-leveled workload queue should accommodate more read requests or write requests than queue depths of a medium-leveled workload queue; queue depths of a medium-leveled workload queue accommodate more read requests or write requests than queue depths of a shallow-leveled workload queue; and storage block size has a medium size. Similarly, the long duration is longer than the medium duration and the medium duration is longer than the short duration.

As mentioned above, there are many conditions of workloads which affect the scheduler configuration function to decide the queue depth and the wait time. All conditions are disclosed below. In the embodiment, the cloud storage system 5 supports video streaming, OLTP database, and mail server. These workloads are only used for illustration and not used to limit the application of the present invention. Workloads other than the above-mentioned three can be used. The video streaming is a sequential I/O type, has more read requests than write requests, requires storage block size larger than or equal to 8K, generates IOPS or throughput to be close to the respective performance throttling of IOPS or throughput, and has latency to be close to or below the performance guarantee of latency. As shown in FIG. 2, a queue depth $QW_1$ of the workload queue in workload queue group $W_1$ is set to be medium-leveled (5) and the wait time for each workload queue is set to be short duration (20 ms). The request dispatching sub-module 103 arranges the requests from the workload queue group $W_1$ to a first SSD device queue $QS_1$ for the SSD 61 and to a first HDD device queue $QH_1$ for the HDD 63.

The OLTP database is a random I/O type, has similar number of read/write requests or more read requests than write requests, requires storage block size larger than or equal to 8K, generates IOPS or throughput to be close to or below the respective performance guarantee of IOPS or throughput, and has latency to be close to the or below the performance guarantee of latency. A queue depth $QW_2$ of the workload queue in workload queue group $W_2$ is set to be shallow-leveled (2) and the wait time for each workload queue is set to be short duration (20 ms). The request dispatching sub-module 103 arranges the requests from the workload queue group $W_2$ to the first SSD device queue $QS_1$ for the SSD 61 and to a second SDD device queue $QS_2$ for the SDD 62.

The mail server is a random I/O type, has more read requests than write requests (or even equal to), requires storage block size smaller than 8K, generates IOPS or throughput to be close to the respective performance throttling of IOPS or throughput, and has latency not to be close to the or below the performance guarantee of latency. A queue depth $QW_n$ of the workload queue in workload queue group $W_n$ is set to be deep-leveled (7) and the wait time for each workload queue is set to be long duration (100 ms). The request dispatching sub-module 103 arranges the requests from the workload queue group $W_n$ to the first HDD device queue $QH_1$ for the HDD 63 and to the second HDD device queue $QH_2$ for the HDD 64.

The complete combination of workload conditions are tabulated in FIG. 3. It is obvious that the video streaming, the OLTP database, and the mail server are condition No. 1, No. 5, and No. 10, respectively. The rest conditions are illustrated below.

For condition No. 2, if the received values of IOPS or throughput are close to respective performance throttlings, the received values of latency are close to or below the performance guarantee, the read/write ratio is greater than or equal to 1, and the storage block size is smaller than the medium size, the queue depth of the workload queue is set to be deep-leveled and the wait time for each workload queue is set to be medium duration.

For condition No. 3, if the received values of IOPS or throughput are close to respective performance throttlings, the received values of latency are close to or below the performance guarantee, the read/write ratio is smaller than 1, and the storage block size is larger than or equal to the medium size, the queue depth of the workload queue is set to be medium-leveled and the wait time for each workload queue is set to be short duration.

For condition No. 4, if the received values of IOPS or throughput are close to respective performance throttlings, the received values of latency are close to or below the performance guarantee, the read/write ratio is smaller than 1, and the storage block size is smaller than the medium size, the queue depth of the workload queue is set to be medium-leveled and the wait time for each workload queue is set to be short duration.

For condition No. 6, if the received values of IOPS or throughput are close to or below respective performance guarantees, the received values of latency are close to or below the performance guarantee, the read/write ratio is greater than or equal to 1, and the storage block size is smaller than the medium size, the queue depth of the workload queue is set to be medium-leveled and the wait time for each workload queue is set to be medium duration.

For condition No. 7, if the received values of IOPS or throughput are close to or below respective performance guarantees, the received values of latency are close to or below the performance guarantee, the read/write ratio is smaller than 1, and the storage block size is greater than or equal to the medium size, the queue depth of the workload queue is set to be shallow-leveled and the wait time for each workload queue is set to be short duration.

For condition No. 8, if the received values of IOPS or throughput are close to or below respective performance guarantees, the received values of latency are close to or below the performance guarantee, the read/write ratio is smaller than 1, and the storage block size is smaller than the medium size, the queue depth of the workload queue is set to be shallow-leveled and the wait time for each workload queue is set to be short duration.

For condition No. 9, if the received values of IOPS or throughput are close to respective performance throttlings, the received values of latency are not close to or below the performance guarantee, the read/write ratio is greater than or equal to 1, and the storage block size is greater than or equal to the medium size, the queue depth of the workload queue is set to be medium-leveled and the wait time for each workload queue is set to be medium duration.

For condition No. 11, if the received values of IOPS or throughput are close to respective performance throttlings, the received values of latency are not close to or below the performance guarantee, the read/write ratio is smaller than 1, and the storage block size is greater than or equal to the medium size, the queue depth of the workload queue is set to be medium-leveled and the wait time for each workload queue is set to be short duration.

For condition No. 12, if the received values of IOPS or throughput are close to respective performance throttlings, the received values of latency are not close to or below the performance guarantee, the read/write ratio is smaller than 1, and the storage block size is smaller than the medium size, the queue depth of the workload queue is set to be medium-leveled and the wait time for each workload queue is set to be medium duration.

For condition No. 13, if the received values of IOPS or throughput are close to or below respective performance guarantees, the received values of latency are not close to or below the performance guarantee, the read/write ratio is greater than or equal to 1, and the storage block size is greater than or equal to the medium size, the queue depth of the workload queue is set to be shallow-leveled and the wait time for each workload queue is set to be short duration.

For condition No. 14, if the received values of IOPS or throughput are close to or below respective performance guarantees, the received values of latency are not close to or below the performance guarantee, the read/write ratio is greater than or equal to 1, and the storage block size is smaller than the medium size, the queue depth of the workload queue is set to be shallow-leveled and the wait time for each workload queue is set to be medium duration.

For condition No. 15, if the received values of IOPS or throughput are close to or below respective performance guarantees, the received values of latency are not close to or below the performance guarantee, the read/write ratio is smaller than 1, and the storage block size is greater than or equal to the medium size, the queue depth of the workload queue is set to be shallow-leveled and the wait time for each workload queue is set to be short duration.

For condition No. 16, if the received values of IOPS or throughput are close to or below respective performance guarantees, the received values of latency are not close to or below the performance guarantee, the read/write ratio is smaller than 1, and the storage block size is smaller than the medium size, the queue depth of the workload queue is set to be shallow-leveled and the wait time for each workload queue is set to be medium duration.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A Software-Defined Hybrid Storage (SDHS) system which has at least one Hard Disk Drive (HDD) and a Solid State Drive (SSD), wherein the SDHS system has a workload-aware I/O scheduler for handling a plurality of workloads related to services or infrastructures utilizing the SDHS system, the workload-aware I/O scheduler comprising:
a queue managing module, for managing queues, read requests, and write requests, comprising:
a request receiving sub-module, for temporarily holding the read requests and the write requests;
a request controlling sub-module, for creating workload queues, the workload queues comprising a read request queue and a write request queue for each of the plurality of workloads, dynamically configuring the workload queues according to a scheduler configuration function, including dynamically adjusting depths of the workload queues, and arranging the read requests and write requests to the workload queues; and
a request dispatching sub-module, for creating device queues and dispatching each read request or write request from the workload queues to a specified device queue;
a workload property database, for storing properties of the plurality of workloads for access, wherein the properties comprise a read/write ratio, a merge ratio, a SSD hit ratio, and a storage block size; and
a traffic monitoring module, for monitoring and continuously recording values of one or more performance parameters of the SDHS system, and providing the values of the one or more performance parameters to the request controlling sub-module;
wherein the scheduler configuration function calculates a queue depth and a wait time for each workload queue based on the properties provided from the workload property database and the recorded values of the one or more performance parameters such that the values of the one or more performance parameters of the SDHS system can be adjusted; and
wherein each of the one or more performance parameters has a respective performance guarantee and a respective performance throttling and the values of the one or more performance parameters are adjusted while the recorded values are equal to or above the respective performance guarantee and/or the recorded values are equal to or below the respective performance throttling.

2. The SDHS system according to claim 1, further comprising a traffic modeling module, for modeling storage traffic of any one or more of the read/write requests from the plurality of workloads and providing predictive storage traffic of properties in a specified time in the future.

3. The SDHS system according to claim 1, wherein the one or more performance parameters are IOPS, throughput, latency, or a combination thereof.

4. The SDHS system according to claim 1, wherein the performance guarantee and the performance throttling are defined by a Service Level Agreement (SLA) or a Quality of Service (QoS) requirement of the plurality of workloads.

5. The SDHS system according to claim 3, wherein each workload queue is classified as deep-leveled, medium-leveled, or shallow-leveled, and each wait time is classified as a long duration, a medium duration, or a short duration, wherein queue depths of a deep-leveled workload queue accommodate more read requests or write requests than queue depths of a medium-leveled workload queue; queue depths of a medium-leveled workload queue accommodate more read requests or write requests than queue depths of a shallow-leveled workload queue; the long duration is longer than the medium duration; and the medium duration is longer than the short duration.

6. The SDHS system according to claim 5, wherein if the read/write ratio is greater than or equal to 1, and the storage block size is greater than or equal to the medium size, the queue depth of each of the workload queues is set to be medium-leveled and the wait time for each workload queue is set to be short duration.

7. The SDHS system according to claim 5, wherein if the read/write ratio is greater than or equal to 1, and the storage block size is smaller than the medium size, the queue depth of each of the workload queues is set to be deep-leveled and the wait time for each workload queue is set to be medium duration.

8. The SDHS system according to claim 5, wherein if the read/write ratio is smaller than 1, the queue depth of each of the workload queues is set to be medium-leveled and the wait time for each workload queue is set to be short duration.

9. The SDHS system according to claim 5, wherein if the read/write ratio is greater than or equal to 1, and the storage block size is greater than or equal to the medium size, the queue depth of each of the workload queues is set to be shallow-leveled and the wait time for each workload queue is set to be short duration.

10. The SDHS system according to claim 5, wherein if the read/write ratio is greater than or equal to 1, and the storage block size is smaller than the medium size, the queue depth of each of the workload queues is set to be medium-leveled and the wait time for each workload queue is set to be medium duration.

11. The SDHS system according to claim 5, wherein if and the read/write ratio is smaller than 1, the queue depth of each of the workload queues is set to be shallow-leveled and the wait time for each workload queue is set to be short duration.

12. The SDHS system according to claim 5, wherein if the read/write ratio is greater than or equal to 1, and the storage block size is greater than or equal to the medium size, the queue depth of each of the workload queues is set to be medium-leveled and the wait time for each workload queue is set to be medium duration.

13. The SDHS system according to claim 5, wherein if the read/write ratio is greater than or equal to 1, and the storage block size is smaller than the medium size, the queue depth of each of the workload queues is set to be deep-leveled and the wait time for each workload queue is set to be long duration.

14. The SDHS system according to claim 5, wherein if read/write ratio is smaller than 1, and the storage block size is greater than or equal to the medium size, the queue depth of each of the workload queues is set to be medium-leveled and the wait time for each workload queue is set to be short duration.

15. The SDHS system according to claim 5, wherein if read/write ratio is smaller than 1, and the storage block size is smaller than the medium size, the queue depth of each of the workload queues is set to be medium-leveled and the wait time for each workload queue is set to be medium duration.

16. The SDHS system according to claim 5, wherein if the storage block size is greater than or equal to the medium size, the queue depth of each of the workload queues is set to be shallow-leveled and the wait time for each workload queue is set to be short duration.

17. The SDHS system according to claim 5, wherein if the storage block size is smaller than the medium size, the queue depth of each of the workload queues is set to be shallow-leveled and the wait time for each workload queue is set to be medium duration.

18. The SDHS system according to claim 5, wherein if the SSD hit ratio increases, the queue depth of each of the workload queues remains the same or becomes shallower and the wait time for each workload queue remains the same or becomes shorter, otherwise the queue depth of each of the workload queues remains the same or becomes deeper and the wait time for each workload queue remains the same or becomes longer.

19. The SDHS system according to claim 5, wherein if the merge ratio increases, the queue depth of each of the workload queues remains the same or becomes shallower and the wait time for each workload queue remains the same or becomes shorter, otherwise the queue depth of each of the workload queues remains the same or becomes deeper and the wait time for each workload queue remains the same or becomes longer.

20. The SDHS system according to claim 5, wherein the medium size is 8 KB.

* * * * *